(12) United States Patent
Chun et al.

(10) Patent No.: US 6,772,584 B2
(45) Date of Patent: Aug. 10, 2004

(54) APPARATUS FOR REMOVING SOOT AND $NO_x$ IN EXHAUST GAS FROM DIESEL ENGINES

(76) Inventors: Kwang Min Chun, Jangmi Apt. 8-1106, Sincheon Dong, Songpa Gu, Seoul 138-240 (KR); Bae Hyeock Chun, 44-5 Jangchung Dong, 1 Ga, Jung Gu, Seoul 100-391 (KR); Woong Sup Yoon, Ssang-yong Apt. 504-1202, 767 Muwonmaeul Haengsin Dong, Deonyang Gu, Goyang-Si, Gyeonggi-Do 412-220 (KR); Kwan Young Lee, Sambu Apt. 1-122, 30 Yeouido Dong, Yeongdeungpo Gu, Seoul 150-882 (KR); Jung Ho Hwang, Dong-a Green Apt. 106-1402, 411 Ichon-Dong, Yongsan-Gu, Seoul 140-030 (KR); Kyo Seung Lee, Korong Villa 2-302, 322-1 Hongeun 3-Dong, Seodaemoong-Gu, Seoul 120-848 (KR); Dong Hoon Jeong, Imaechon Apt. 605-1602, 123 Imae Dong, Bundang Gu, Seongnam Si, Gyeonggi Do 463-796 (KR); Hyeong Sang Lee, Naksung Hundae Apt., 102-902, 181-1 Bongcheon Dong, Gwanak Gu, Seoul 151-050 (KR); Dae Won Lee, Junong Apt., 312-907, Dunchon Dong, Gangdong Gu, Seoul 134-060 (KR); Jae Hong Ryu, Jinyang Apt., 1-1454, Chungmuro 4-Ga, Jung Gu, Seoul 100-863 (KR)

( * ) Notice: Subject to any disclaimer, the term of this patent is extended or adjusted under 35 U.S.C. 154(b) by 0 days.

(21) Appl. No.: 10/173,601

(22) Filed: Jun. 19, 2002

(65) Prior Publication Data
US 2003/0233824 A1 Dec. 25, 2003

(51) Int. Cl.⁷ .................................... F01N 3/00

(52) U.S. Cl. .............................. 60/275; 60/274; 60/295; 60/297; 60/303; 60/311; 422/186.01; 422/186.3; 422/186.16

(58) Field of Search .......................... 60/274, 275, 295, 60/286, 297, 301, 303, 311; 422/186.1, 186.3, 186.04, 186.16

(56) References Cited

U.S. PATENT DOCUMENTS

| | | | | |
|---|---|---|---|---|
| 5,422,085 A | * | 6/1995 | Bell et al. | 423/213 |
| 5,711,147 A | * | 1/1998 | Vogtlin et al. | 60/274 |
| 5,807,466 A | * | 9/1998 | Wang et al. | 204/177 |
| 6,038,854 A | * | 3/2000 | Penetrante et al. | 60/297 |
| 6,176,078 B1 | * | 1/2001 | Balko et al. | 60/274 |
| 6,314,722 B1 | * | 11/2001 | Matros et al. | 60/274 |

* cited by examiner

Primary Examiner—Binh Tran
(74) Attorney, Agent, or Firm—GWiPS

(57) ABSTRACT

A plasma system is provided for removing soot and nitrogen oxide ($NO_x$) in the exhaust gas of diesel engines. The system is comprised of a diesel particulate filter for adopting a honeycomb type porous element and at least one pair of electrodes; a plasma reactor for generating a predetermined amount of plasma, mounted downward or upward the diesel particulate filter; a catalytic reactor filled with a catalyst selected from 1B metal group, mounted downward the plasma reactor or the diesel particulate filter; and a means for supplying hydrocarbon to the exhaust gas, connected to a proper position upward the plasma reactor. Therefore, the soot and $NO_x$ in the exhaust gas, which are not only harmful to humans, but also which pollute the environment could be effectively removed under a normal pressure.

14 Claims, 4 Drawing Sheets

APPARATUS FOR REMOVING SOOT AND $NO_x$ IN EXHAUST GAS FROM DIESEL ENGINES

BACKGROUND OF THE INVENTION

1. Field of the Invention

The present invention relates to an apparatus for removing soot and nitrogen oxide ($NO_x$) in the exhaust gas of diesel engines. Particularly, the inventive apparatus is equipped with a plasma/catalyst system comprising a diesel particulate filter, plasma reactor and catalytic reactor for efficiently removing the harmful pollutants in the exhaust gas.

2. Description of the Prior Art

Generally, the diesel engine has an advantage in that it exhausts less pollutant, such as CO and $CO_2$ gases and hydrocarbons, which have been shown to be the cause of global warming. The environment is therefore more protected by the use of the diesel engine, owing to its higher heat efficiency and durability in comparison to the gasoline engine.

However, nitrogen oxide ($NO_x$) in the exhaust gas of the diesel engine causes to generate the photochemical smog, acid rain and ozone ($O_3$). In addition, because the soot particulates in the air are more capable of absorbing light than any other particulates, the soot causes poor visibility and also respiratory disease if such particulates are inhaled in any great amount.

There are various filtering technologies for the exhaust gas of the diesel engine. One method physically filters the soot-particles through a filter. Another method is that NO in the exhaust gas oxidizes to $NO_2$ by using non-thermal plasma, then the soot and $NO_x$ are simultaneously eliminated. Further, another method is that hydrocarbon is oxidized or $NO_x$ is deoxidized by catalyst. A combination or modification of the various methods is also used.

European Pat. EP0937870 to the Delphi Co. discloses an apparatus for the removal of hydrocarbon, CO and $NO_x$ by using a plasma/catalyst system. According to the Delphi's apparatus, the exhaust gas passes through a primary catalytic layer and plasma reactor and then a secondary catalytic layer sequentially. Through the process, a portion of the hydrocarbon and CO gases is removed by being oxidized in the primary catalytic layer, and NO is converted to $NO_2$ in the plasma reactor. Sequentially, the residual hydrocarbon and CO gases are removed in the secondary catalytic layer by oxidizing with $NO_2$, which is produced in the plasma reactor, and catalyst.

PCT numbers WO98/00221 and U.S. Pat. Nos. 5,746,984 and 6,156,162 to Hoard disclose the apparatuses, comprised of a filter and plasma reactor for the treatment of the exhaust from a diesel engine. The particulates collected in the filter are removed by oxidizing with $NO_2$, produced in the plasma reactor, and disposed of in front of the filter. The filter is made of ceramic, zeolite or perovskite coated with copper oxides or barium oxides. The time for reacting the plasma and replacing the filter is determined depending on the increasing the backpressure of the filter (or decreasing the engine output) by a sensor mounted at the outlet of the apparatus as mentioned above. In addition, it discloses the other various plasma reactors.

U.S. Pat. Nos. 5,711,147; 6,038,853 and 6,038,854 to Penetrante et al. disclose a system for removing $NO_x$ and particulates by a two-step process. In the first step, NO is oxidized to $NO_2$ during which time the plasma is generated under the presence of $O_2$ and hydrocarbon, and the produced $NO_2$ reacts with soot particles for converting to $N_2$ or $CO_2$. In the second step, the residual $NO_2$ passes through a catalytic layer under the presence of hydrocarbons for deoxidizing to $N_2$. Especially, U.S. Pat. No. 6,038,854 discloses an implementable example of the plasma/filter/catalyst system.

U.S. Pat. Nos. 4,902,487 and 5,943,857 and PCT WO 00/21646 to Johnson Matthey Co. disclose a system for treating the exhaust gas comprised of a catalyst and a diesel particulate filter. The particulate substances are collected through the filter and oxidized by $NO_2$, which is produced in the catalytic layer installed in the front end of the filter at the normal temperature for removal. It is possible to use a plasma reactor instead of the catalyst. In this case, ozone ($O_3$) is also produced to oxidize with soot.

PCT numbers WO 00/43645 and WO 00/43102 to AEA Technology disclose a method for the removal of particulates and $NO_x$ by using a plasma reactor and catalyst. When plasma is generated by adding hydrocarbons, NO is transformed to $NO_2$, then the generated $NO_2$ oxidizes the soot to remove. The residual $NO_x$ is removed by catalyst. A dielectric barrier is disposed between the electrodes without installing a filter.

PCT number WO 00/29727 to Engelhard Co. discloses a system for removing $NO_x$ (excluding the soot) by using a plasma reactor and catalyst. This system produces $NO_2$ by plasma under the highly concentrated hydrocarbon to deoxidize with catalyst. It discloses that when a molar ratio of carbon atom to $NO_x$ is 5:1 in the exhaust gases, approximately 50% of $NO_x$ is transformed to $N_2$.

Ford Co. also reported that when a molar ratio of $NO_x$ to carbon atom is about 1:5 in the exhaust gas (the same ratio as the Engelhard Co.) by using plasma and catalyst, which is developed by itself, the transforming rate of $NO_x$ to $N_2$ and hydrocarbon to water and $CO_2$ is 50% and 30%, respectively.

In the International Symposium on High Pressure, Low Temperature Plasma Chemistry held at Greifswald, Germany (Sep. 10~13, 2000), Institute of Nonthermal Plasma Physics and Th. J. Heimbach GmbH disclosed an apparatus for removing soot as shown in FIG. 1 in which a porous element 11 for collecting the soot is used as an electrode. The other electrode 12a coated with dielectric barrier is inserted into the center of the filter cell to generate plasma. Thus, the filter cell itself is used as a plasma reactor for removing the collected soot on the filter (HAKONE VII).

For the detailed descriptions referring to FIG. 1, the soot in the exhausted gas is filtered through the porous element 11 used as an electrode. The NO in the exhaust gas is transformed to $NO_2$ by the plasma generated between the porous element 11 and electrode 12, coated with a dielectric barrier, present at the center of each filter cell. When the produced $NO_2$ passes through the porous element 11 electrode, the collected soot on the filter is oxidized and thereby removed.

According to the conventional systems for simultaneously removing soot and $NO_x$, NO in the exhaust, gas is transformed to $NO_2$ through the reaction as represented in the following reaction formula 1, and then the soot and $NO_2$ are simultaneously removed by the reaction as represented in the following reaction formula 2. The residual $NO_2$ is reduced to $N_2$ by the catalyst.

Reaction Formula 1:
NO+½ $O_2 \rightarrow NO_2$
Reaction Formula 2:
C(soot)+$NO_2 \rightarrow$ CO+NO or $CO_2$+½$N_2$ Because the reaction for removing the soot and $NO_x$ occurs while the exhaust gas containing $NO_2$ is passing through the layer of soot collected on the filter, the reacting time is very short. Therefore, the soot in the exhaust gas is incompletely treated.

SUMMARY OF THE INVENTION

In order to overcome the problems as described above, the present invention provides a plasma system for completely removing the soot and $NO_x$ in the exhaust gas of a diesel engine.

An objective of the present invention is to provide an apparatus for removing soot and nitrogen oxide in the exhaust gas of diesel engines by a diesel particulate filter adopting a honeycomb type porous element and having at least one pair of electrodes. A plasma reactor for generating a predetermined amount of plasma is mounted downward on the diesel particulate filter. A catalytic reactor is filled with a catalyst selected from 1B metal group and mounted downward on the plasma reactor. A means of supplying hydrocarbon is connected to a proper position upward on the plasma reactor.

The electrodes in the diesel particulate filter are comprised of a rod-type electrode able to be inserted into the center of the passage section, and a pipe-type electrode mounted to the outside of the passage section. The electrodes in the diesel particulate filter could enable a rod-type electrode to be mounted in a parallel direction, directly opposite from the passage section.

The plasma reactor generates plasma by a method selected either one of corona discharge, microwave radiation, UV radiation, radio frequency (RF) discharge, dielectric barrier discharge, glow discharge, surface discharge, or plasma jet. The plasma reactor selectively applies either one of direct current, direct current pulse or alternating current as a power source. The plasma reactor is equipped with an electrode comprising an iron sheet coated with a ceramic layer, which is an insulator. The catalytic reactor is filled with silver catalyst.

A means for supplying hydrocarbon is to supply hydrocarbon from a separate hydrocarbon source or unburned residual fuel during the post injecting process of diesel engine if a separated hydrocarbon source is not provided. The supplied hydrocarbon can be selected either one of propane, propylene or unburned residual diesel fuel. The hydrocarbons have 2–20 carbon atoms.

An apparatus for removing soot and nitrogen oxide in the exhaust gas of diesel engines is comprised of: a plasma reactor for generating plasma from supplied AC power source; a diesel particulate filter connected downward on the plasma reactor, a catalytic reactor for adopting a predetermined catalyst connected downward on the diesel particulate filter, and a means for supplying hydrocarbon connected to a proper position upward on the plasma reactor.

DETAILED DESCRIPTION OF THE PREFERRED EMBODIMENT

Figure 1:
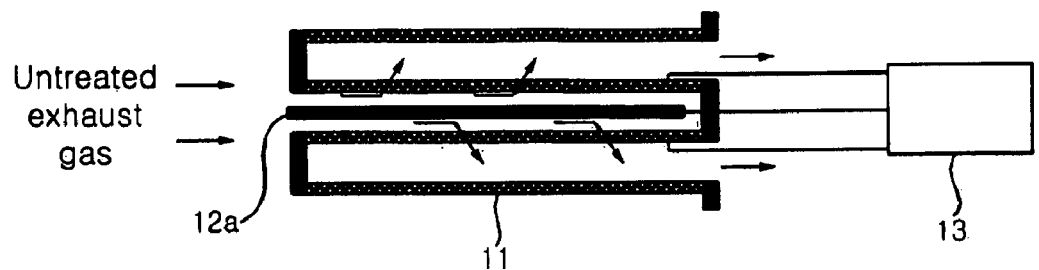
FIG. 1 is a conceptual diagram showing a treatment system of exhaust gas of diesel engine developed by the Institute of Nonthermal Plasma Physics and Th. J. Heimbach GmbH.

The objectives, features and advantages of the present invention will be more clearly understood through the following detailed descriptions accompanying with the drawings.

A plasma system for achieving the objectives of the present invention is introduced by dividing the objectives into two aspects. The first category includes a diesel particulate filter 10 having adopted a honeycomb type porous element 11 and at least one pair of electrodes 12; a plasma reactor 20 producing a certain amount of plasma, mounted downward on the diesel particulate filter 10; a catalytic reactor 30 filled with a catalyst selected from the 1B metal groups, mounted downward on the plasma reactor 20; and a means for supplying the hydrocarbon connected to a proper position upwards on the plasma reactor 20.

The other aspect of the plasma system of the present invention is composed of a plasma reactor 20' for generating plasma supplied AC power; a diesel particulate filter 10' connected downward on the plasma reactor 20'; a catalytic reactor 30' which has adopted a certain catalyst connected downward the diesel particulate filter 10'; and a hydrocarbon feeding means for feeding hydrocarbon to the exhaust gas connected to a proper position upward on the plasma reactor 20'.

Figure 2:
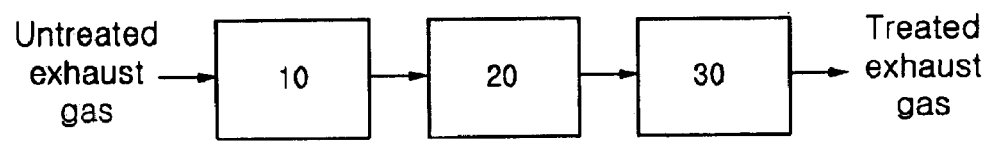
FIG. 2 is a schematic block diagram showing an apparatus according to one embodiment of the present invention.
Figure 3:
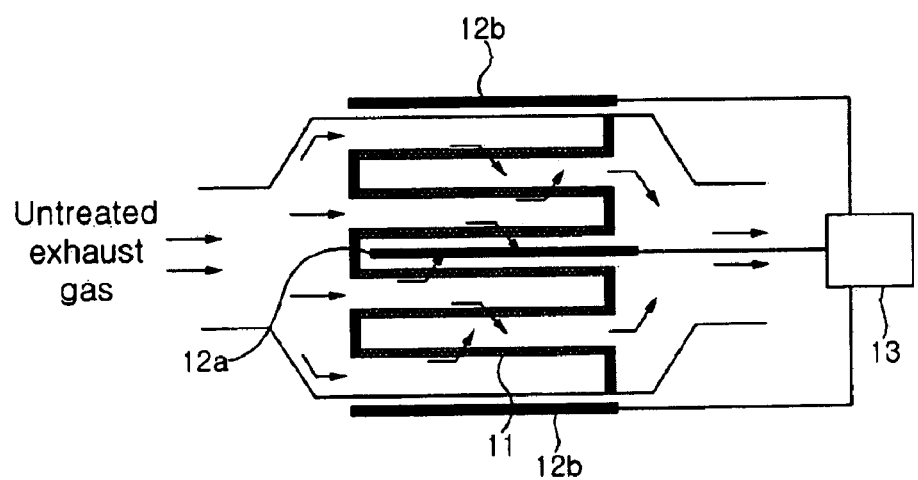
FIG. 3 is a conceptual diagram showing one embodiment of a diesel exhaust dust filter applied to FIG. 2.
Figure 4:
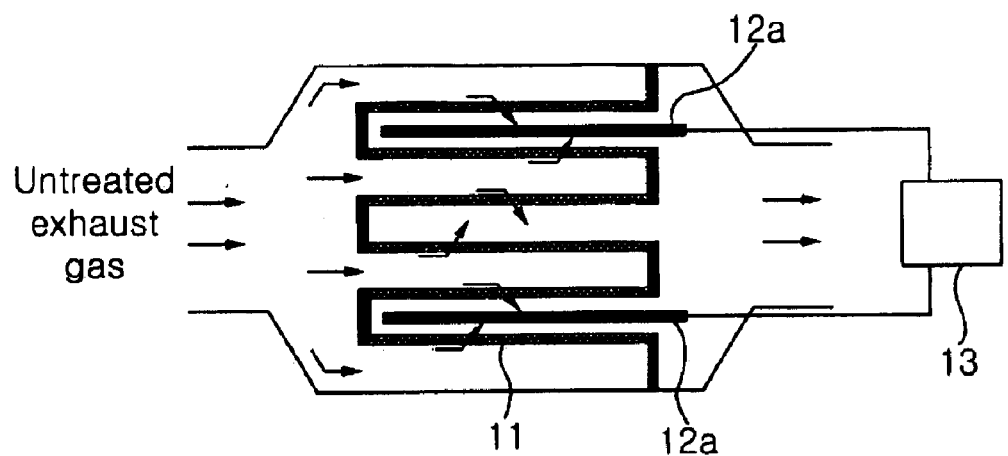
FIG. 4 is a conceptual diagram showing another embodiment of a diesel exhaust dust filter applied to FIG. 2.

FIG. 2 shows an apparatus designed according to one embodiment of the present invention. FIG. 3 shows one embodiment of the diesel particulate filter applied to FIG. 2. FIG. 4 shows another embodiment of the diesel particulate filter applied to FIG. 2.

The diesel particulate filter 10, which is the most distinguished element in the system of the present invention, is comprised of a honeycomb-type porous element 11, an electrode 12a inserted from the rear of porous element 11, and an electrode 12b, which entirely shields the porous element 11. Two electrodes are connected to a power supply 13, in the same manner as in a plasma reactor. When the soot is accumulated on the filter, the electric discharge occurs, burning out the soot.

The present invention is based on the fact that a breakdown voltage is lowered when the conductive material is presented between the two electrodes 12a, 12b and a finding that most considerable amounts (about 50%) of soot generated from the diesel engine is electrically conductive similar to the graphite.

Comparing the results obtained from the Institute of Nonthermal Plasma Physics and Th. J. Heimbach GmbH with the present invention, the difference is that the electrode is not inserted to every filter cell. The electrode is inserted from the rear of the porous element 11. The filter itself is not used as an electrode. The electrode function also is not aimed for chemical reaction based on the reaction formula 1.

In the form of electrodes, the electrode 12b enclosed the entire porous element 11 can be substituted by another type of electrode 12a inserted from the rear of the porous element 11 as shown in FIG. 4. Even if power is supplied between a pair of electrodes 12a inserted from the rear of the porous element 11, the effect will be the same as obtained from 12b. The number of electrodes is more than 2.

The performance of removing the soot in the diesel particulate filter 10 of the present invention is described as follows.

(1) Under the condition of a voltage loaded between the two electrodes, the exhaust gas of diesel engine continuously passes through the diesel particulate filter to accumulate soot on the filter. Around the areas of accumulated soot, especially areas of too much build-up of soot, the breakdown voltage is lowered to occur the dielectric barrier discharge (DBD). As mentioned before, because the molecular structure of soot is similar to that of graphite, it has an electric conductivity. Thus, the location of discharging occurrence and the breakdown voltage varies depending on the location and amount of accumulated soot.

A process mechanism is seen in FIG. 2 for filtering and accumulating soot on the diesel particulate filter through the stream of exhaust gas.

(2) Once oxidizing occurs at the spot of accumulated soot by discharging, the temperature rapidly rises to spontaneously oxidize the soot. After burning out all of the accumulated soot, the breakdown voltage at the spot of burning is raised back to stop discharging.

(3) However, when a constant voltage is loaded between the two electrodes, the breakdown voltage is lowered again at the spot of accumulated soot. Then, the discharging occurs to oxidize the accumulated soot at the different spot. The same phenomenon continuously occurs after burning out the accumulated soot, as described above.

Further explanation of the oxidizing process for burning out the accumulated soot follows;

(1) At the location of accumulated soot, the breakdown voltage is decreased to discharge.
(2) Once discharging occurs, some of the oxygen molecules in the exhaust gas are transformed into two oxygen radicals, and some of the O-radicals are transformed to ozone ($O_3$).
(3) If the soot is oxidized by ozone, it is spontaneously removed and the breakdown voltage is increased to stop discharging.
(4) The oxidizing continuously takes places from a spot to next spot where the soot is accumulated due to be lowered the breakdown voltage. Steps (1), (2) and (3) are continuously repeated for oxidizing reactions.

Accordingly, the system of the present invention is not designed based on the reaction formula 2 for removing the soot. It also does not generate any plasma in the diesel particulate filter 10 all the time in contrast to the apparatus of Heimbach GmbH. That is, to maintain the proper backpressure in the diesel particulate filter 10, (for discharging under the moderate backpressure), the potential between the two electrodes should be properly maintained. If consistent backpressure is maintained in the diesel particulate filter 10, a sequence process of discharging->igniting->oxidizing occurs to remove the soot from the spot to the spot where the soot is most built-up. Instead of the porous element 11, a ceramic monolith filter, ceramic fiber filter or metal filter, etc. could be used. The electrode 12, which can be inserted from the rear of porous element 11 is used with or without insulation coating.

In contrast to the apparatus suggested by the Institute of Nonthermal Plasma Physics and Th. J. Heimbach GmbH, the apparatus of the present invention adapts so that the electrode contacts with the filtered exhaust gas through the porous element 11. Because the soot will not be directly deposited on the electrode, it is possible to use the electrode without coating.

The soot and $NO_2$ will not be radically removed in the plasma reactor 20. It is known that NO is transformed to $NO_2$ under the presence of hydrocarbons. Further, the soot and $NO_2$ are simultaneously removed by the reactions according to the reaction formula 2. The residual $NO_2$ is reduced to $N_2$ by catalyst.

Accordingly, it is desirable to supply hydrocarbons at a proper position prior to the plasma reactor 20 by means of supplying hydrocarbon. Regarding the means of supplying hydrocarbon, it is possible to supply the hydrocarbon from a separate hydrocarbon source. It is also possible to supply hydrocarbon from the unburned residual fuel during the post injecting process of diesel engine without any separated means of supplying hydrocarbon. The supplied hydrocarbon can be selected either one of propane, propylene or unburned diesel fuel. It may be mounted between the engine and diesel particulate filter 10 or the diesel particulate filter 10 and plasma reactor 20. The supplied hydrocarbon is used with the ranges of 2~20 carbon atoms.

The present invention adapts the plasma reactor 20, such as a corona discharge, microwave radiation, UV radiation, radio frequency (RF) discharge, dielectric barrier discharge, glow discharge, surface discharge, or plasma jet for generating plasma. The power supply is selectively used either one of direct current, direct current pulse or alternating current.

The residual $NO_2$ is removed according to the reaction formula 3 in the catalytic reactor 30. The catalyst is selected from group 1B. It is most desirable to use silver (Ag).

Reaction Formula 3:

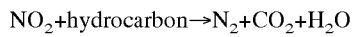

$NO_2$+hydrocarbon→$N_2$+$CO_2$+$H_2O$

Figure 7:
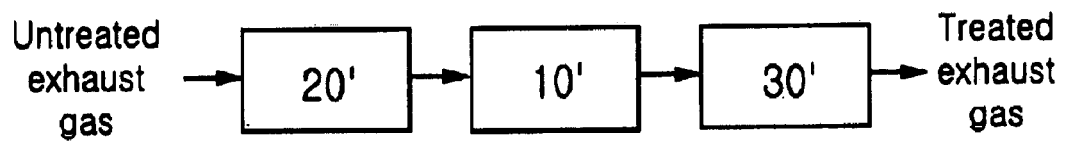
FIG. 7 is a schematic block diagram showing an apparatus according to another embodiment of the present invention.
Figure 8:
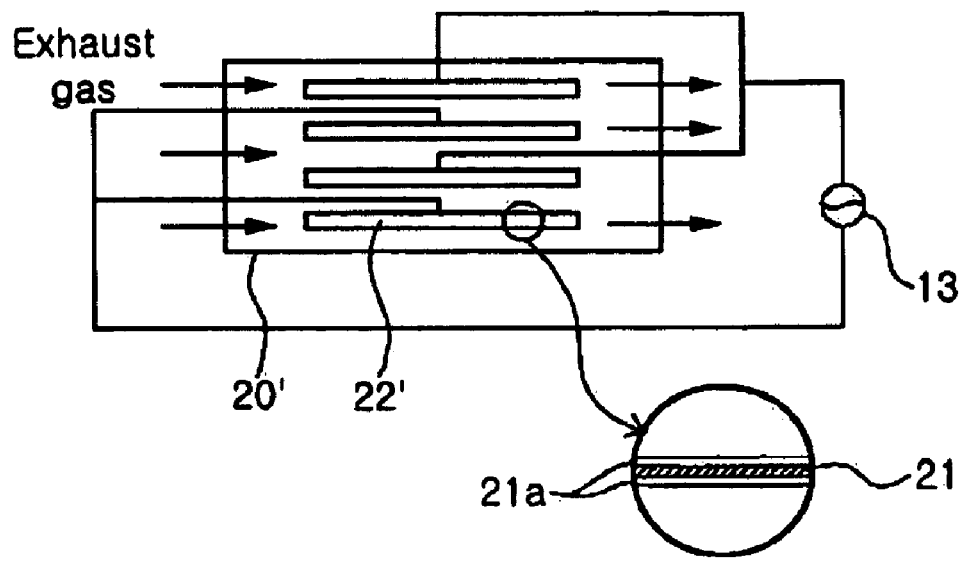
FIG. 8 is a conceptual diagram showing the main configuration of a plasma reactor in FIG. 7.
Figure 9:
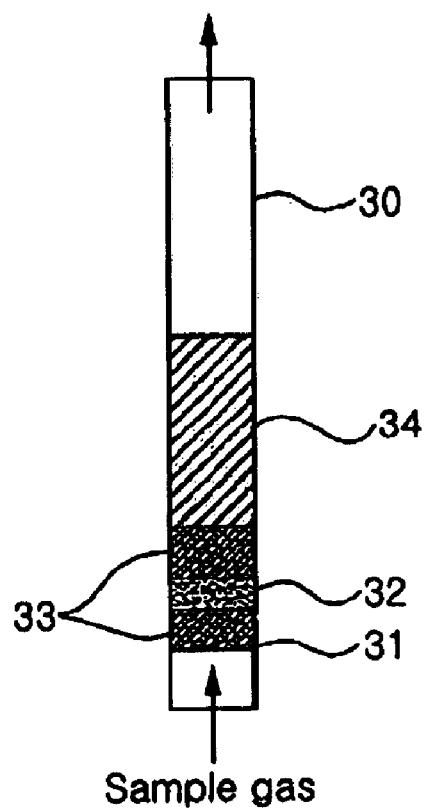
FIG. 9 is a conceptual diagram showing a main configuration of a catalytic reactor in FIG. 7.

Now turning to FIG. 7, the second apparatus is shown according to another embodiment of the present invention. A schematic block diagram including the plasma reactor and catalytic reactor is shown in FIG. 7. A main configuration of the plasma reactor and catalytic reactor is shown in FIGS. 8 and 9, respectively. The present apparatus is comprised of a plasma reactor 20' supplied with AC power, diesel particulate filter 10' directly connected to the plasma reactor and a catalytic reactor 30' filled with silver catalyst. A mixture of the hydrocarbons and untreated diesel engine exhaust gases will pass through the plasma reactor 20', diesel particulate filter 10' and catalytic reactor 30' sequentially to remove the soot and $NO_x$.

It is known that hydrocarbon stimulates NO to transform to $NO_2$. Accordingly, it is possible to supply hydrocarbons by means of supplying hydrocarbon at a proper position prior to the plasma reactor 20' from a separated hydrocarbon source or injecting the residual fuel contained a plenty of hydrocarbons during the post injection process of diesel engine without a separated supplying means. At this moment, the hydrocarbons can be used with the ranges of 2~20 carbon atoms.

A detailed configuration of the plasma reactor is shown in FIG. 8. A steel plate 21 coated with ceramic 21a, such as an alumina, is alternatively arranged as an electrode 22 for operating at a normal pressure with supplying energy of 10–100 J/L per unit flow of exhaust gas. The $NO_x$ or soot will not be fundamentally removed in the plasma reactor 20', but the reactions will occur to transform NO to $NO_2$.

The soot in the exhaust gas is filtered and collected on the diesel particulate filter 10'. The collected soot will react with the transformed $NO_2$ to burn off in the plasma reactor 20'.

A silver catalyst filling the catalytic reactor 30' uses an $Ag/Al_2O_0$ catalyst prepared by incorporating aqueous $AgNO_3$ solution into $\gamma$-$Al_2O_3$ to sinter. The catalytic reactor 30' operates at the temperature of 200~450° C. The deoxidizing reaction of $NO_x$ that $NO_2$ and NO are reduced to $N_2$, which occurs in the catalytic reactor 30'.

The following examples are presented here for a better understanding of the present invention.

EXAMPLE 1

The presentations are the implementing examples of diesel particulate filter, plasma, and catalyst system of the present invention. The soot removal capability is measured by varying the input frequency when the soot accumulates on a diesel particulate filter 10 by passing through the exhaust gas of diesel engine (2.9 L, Carnival manufactured by Kia Motors, Korea). The AC power source of 10 kV is connected between two electrodes 12a and 12b as a power supply 13 and a mixture gas of helium (90%) and oxygen (10%) is passed through with the flow rate of 0.5 L/min at the temperature of 15° C. The concentrations of CO and $CO_2$ were measured by the chromatography (not shown). Other conditions are listed as follows.

(1) Diesel particulate filter: outer diameter 47 mm, length 200 mm
(2) Glass tube: inner diameter 47 mm, length 300 mm
(3) Electrode: stainless rod (center electrode) with a diameter of 1 mm, and iron net (outside electrode)
(4) Gas Chromatography: using Young In M600, Carboxen-1000 column, and TCD and FID detector.

The concentrations of CO and $CO_2$ were measured while the input frequency varies between 60, 100, 200, 300 and 500 Hz. The results are shown below in the Table 1.

TABLE 1

| No. | Frequency (Hz) | CO (ppm) | CO2 (ppm) |
|---|---|---|---|
| 1 | 60 | 396 | 69 |
| 2 | 100 | 642 | 120 |
| 3 | 200 | 1426 | 229 |
| 4 | 300 | 1625 | 325 |
| 5 | 500 | 2107 | 437 |

From the table, the presence of CO and $CO_2$ implies that soot is oxidized. As the input frequency increases, that is, the energy density is increased; the concentrations of CO and $CO_2$ become higher.

Figure 5:
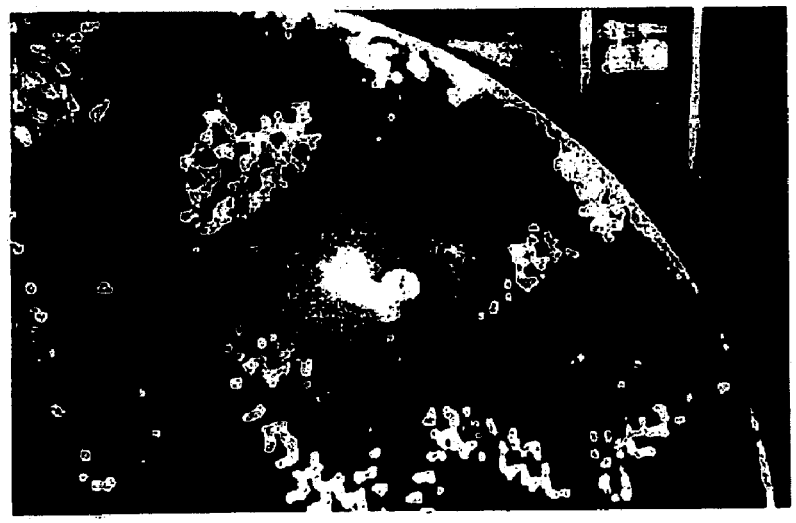
FIG. 5 is a photograph of a diesel particulate filter after soot is removed.

FIG. 5 is a photograph of the diesel particulate filter discharging oxidized soot. In this picture, it is clearly seen the boarder lines of completely burned and unburned portion of soot. The white area is the portion that is regenerated by the complete burning, and the relatively black areas are the unburned portions, which clearly border each other.

Figure 6:
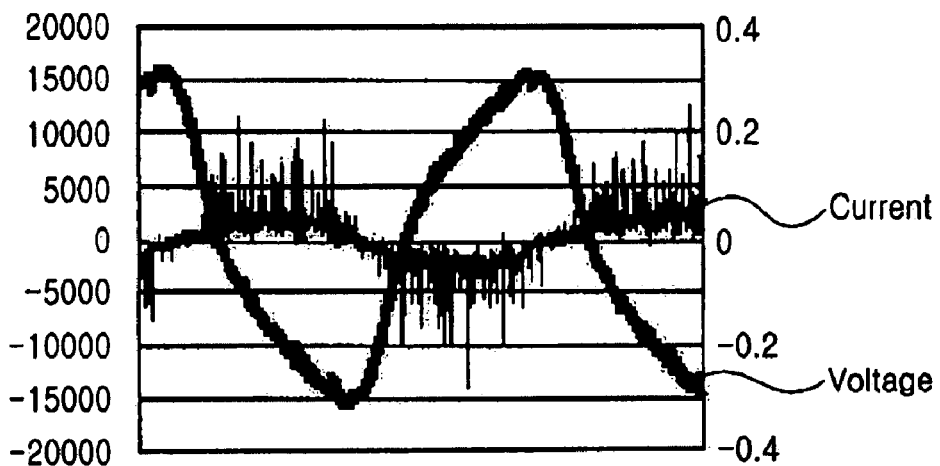
FIG. 6 is a graph of current and voltage flowing between electrodes in a soot-accumulated diesel particulate filter.

FIG. 6 is a measurement of the current flow between the electrodes in the diesel particulate filter containing the accumulated soot. The current is measured at the frequency of 300 Hz, and the peaks signify momentary discharges. The average current without the accumulated soot is 0.4–1.2 mA, which is 16–36% of 2.5–3.3 mA when oxidation takes place.

EXAMPLE 2

The presentations are the implementing examples of a plasma/diesel particulate filter/catalyst system of the present invention. The removal performance of $NO_x$ is measured with a plasma reactor 20' and a catalytic reactor 30' by using sample gas shown in table 2. The diesel particulate filter 10' is not additionally used. A glass filter 31 filled with glass wool within the catalytic reactor 30' is used. The catalytic layer is positioned afterward the filter layer. Each of the $NO_x$ analyzers (Thermo Environmental Instrument, Model 42H-not shown) is connected to the rear of the plasma reactor 20' and the catalytic reactor 30' to quantitatively measure the concentrations of NO and $NO_2$.

The plasma reactor 20' has a cylindrical form with a diameter of 36 mm and a length of 300 mm. The 60 Hz AC was supplied energy at a rate of 15 J/L per unit volume of sample gas.

The silver/alumina catalyst (Ag/Al2O3) was used as the catalyst, and the reactor was operated at the temperature of 250–500° C.

TABLE 2

| Component | NO (ppm) | $NO_2$ (ppm) | $O_2$ (%) | $C_3H_6$ (ppm) | Atmospheric Gas |
|---|---|---|---|---|---|
| Sample Gas | 495 | — | 10 | 1000 | $N_2$ |

The concentrations of gas after passing through the plasma reactor are shown in Table 3, below.

TABLE 3

| Composition | Sample Gas | Exhaust gas in Plasma Reactor |
|---|---|---|
| NO conc. (ppm) | 495 | 8 |
| $NO_2$ conc. (ppm) | — | 450 |

As can be seen in Table 3, most of NO is oxidized to $NO_2$ through plasma reaction. The total amount of NO and $NO_2$ is decreased by about 37 ppm. This means a small amount of $NO_x$ is removed in the plasma reactor. Alternatively it means that the other forms of the nitrogen compounds, which are not measured by the $NO_x$ analyzer, could be transformed.

In addition, it is assumed that soot could be removed in proportion to the amount of $NO_x$, based on the above Reaction Formula 2.

While the temperature of the catalytic reactor increases to 250° C., 350° C., 450° C., the sample gases passes through the diesel particulate filter/catalytic reactor (Fil/Cat) for the first case of the experiment and the plasma/diesel particulate filter/catalytic reactor (Pl/Fil/Cat) for the second case of the experiment. The results of two cases are compared with each other and are listed as shown in the following table 4:

TABLE 4

| Conc. | 250° C. | | 350° C. | | 450° C. | |
|---|---|---|---|---|---|---|
| (ppm) | Fil/Cat | Pl/Fil/Cat | Fil/Cat | Pl/Fil/Cat | Fil/Cat | Pl/Fil/Cat |
| NO | 429 | 116 | 377 | 35 | 60 | 30 |
| $NO_2$ | 6 | 117 | 12 | 13 | 4 | 3 |
| NO + $NO_2$ | 435 | 233 | 389 | 48 | 64 | 33 |

From table 4, it is seen that the removal rate of $NO_x$ through the plasma/diesel particulate filter/catalyst system is higher than that of the diesel particulate filter/catalyst over all temperature ranges. In particular, when the temperature of the catalytic reactor is 450° C., the removal rate of $NO_x$ is maximized. When using a silver catalyst, the activity of the catalyst itself becomes relatively more efficient at high temperatures. As shown in table 4, catalytic activity is significantly increased by plasma reaction.

Generally, it is a favorable system with good catalytic activity at normal temperatures used as an automobile-mounting apparatus. It is noticeable that the removal of $NO_x$ obtained through the combination of plasma and catalytic reactions is excellent at the temperature of 350° C.

By using the diesel particulate filter/plasma/catalyst system or a plasma/diesel particulate filter/catalyst system of the present invention, the soot and $NO_x$ in the exhaust gas of diesel engine, which contains components, which are harmful to humans, and also which pollute the environment, could be effectively removed at normal atmospheric pressure.

The present invention has been described in an illustrative manner and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. An apparatus for removing soot and nitrogen oxide in exhaust gas of diesel engines is comprised of:

a diesel particulate filter adopting a honeycomb type porous element, and having at least one pair of electrodes, wherein said pair of electrodes is loaded a breakdown voltage for burning soot out, in the manner of that said breakdown voltage is lowered as the soot build up to discharge at a location of accumulated soot, once discharging occurred, some of oxygen molecules in the exhaust gas are transformed to two oxygen radicals and some of Oxygen radicals are transformed to ozone ($O_3$), as oxidizing the soot by ozone, said breakdown voltage is increased to stop discharging, a plasma reactor for generating a predetermined amount of plasma, said plasma reactor mounted downward on said diesel particulate filter, a catalytic reactor filled with a catalyst selected from 1B metal group, said catalytic reactor mounted downward on said plasma reactor, and a hydrocarbon supplying means for supplying hydrocarbon to exhaust gas, said hydrocarbon supplying means connected to a proper position upward on said plasma reactor.

2. The apparatus as claimed in claim 1, wherein said electrodes in the diesel particulate filter comprised of a rod type electrode able to be inserted at center of passage section and a pipe type electrode mounted on outside of said passage section.

3. The apparatus as claimed in claim 1, wherein said electrodes in the diesel particulate filter comprised of a rod type electrode, said particulate filter mounted in parallel at directly opposite positions of a passage section.

4. The apparatus as claimed in claim 1, wherein said plasma reactor generates plasma by a method selected either one of corona discharge, microwave radiation, UV radiation, radio frequency (RF) discharge, dielectric barrier discharge, glow discharge, surface discharge, or plasma jet.

5. The apparatus as claimed in claim 4, wherein said plasma reactor is selectively applied a power either one of direct current, direct current pulse and alternating current.

6. The apparatus as claimed in claim 1, wherein said means of supplying hydrocarbon is to supply hydrocarbon from a separated hydrocarbon supplying source or unburned residual fuel during a post injecting process of diesel engine without a separated hydrocarbon supplying source.

7. The apparatus as claimed in claim 6, wherein said means of supplying hydrocarbon is selectively supplied either one of propane, propylene or unburned residual fuel.

8. The apparatus as claimed in claim 6, wherein said hydrocarbons have 2–20 carbon atoms.

9. An apparatus for removing soot and nitrogen oxide in exhaust gas of diesel engines is comprised of:

a diesel particulate filter adopting a honeycomb type porous element, and having at least one pair of electrodes which is enclosed entire porous element, said diesel particulate filter connected downward on said plasma reactor, wherein said pair of electrodes is loaded a breakdown voltage for burning soot out, in the manner of that said breakdown voltage is lowered as the soot build up to discharge at a location of accumulated soot, once discharging occurred, some of oxygen molecules in the exhaust gas are transformed to two oxygen radicals, and some of Oxygen radicals are transformed to ozone ($O_3$), as oxidizing the soot by ozone, said breakdown voltage is increased to stop discharging, a plasma reactor for generating plasma; said plasma reactor supplied AC power, a plasma reactor for generating a predetermined amount of plasma, said plasma reactor mounted downward on the diesel particulate filter, a catalytic reactor filled selectively with a predetermined catalyst, said catalytic reactor connected downward on said particulate filter, and a hydrocarbon supplying means for supplying hydrocarbon to exhaust gas, said hydrocarbon supplying means connected to a proper position upward on said plasma reactor.

10. The apparatus as claimed in claim 9, wherein said means of supplying hydrocarbon is to supply hydrocarbon from a separated hydrocarbon supplying source or unburned residual fuel during a post injecting process of diesel engine without a separated hydrocarbon supplying source.

11. The apparatus as claimed in claim 10, wherein said means of supplying hydrocarbons is selectively supplied either one of propane, propylene or unburned residual fuel.

12. The apparatus as claimed in claim 11, wherein said hydrocarbons have 2–20 carbon atoms.

13. The apparatus as claimed in claim 9, wherein said plasma reactor is equipped with an electrode comprised of an iron sheet coated with a ceramic layer, which is used as an insulator.

14. The apparatus as claimed in claim 9, wherein said catalytic reactor is filled with silver catalyst.

* * * * *